(12) United States Patent
Olarig et al.

(10) Patent No.: US 10,686,833 B2
(45) Date of Patent: Jun. 16, 2020

(54) SYSTEM AND METHOD OF DETECTING AND COUNTERING DENIAL-OF-SERVICE (DOS) ATTACKS ON AN NVME-OF-BASED COMPUTER STORAGE ARRAY

(71) Applicant: Samsung Electronics Co., Ltd., Suwon-si, Gyeonggi-do (KR)

(72) Inventors: Sompong Paul Olarig, Pleasanton, CA (US); Son T. Pham, San Ramon, CA (US); Jason Martineau, Milpitas, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 326 days.

(21) Appl. No.: 15/489,401

(22) Filed: Apr. 17, 2017

(65) Prior Publication Data

US 2018/0288090 A1 Oct. 4, 2018

Related U.S. Application Data

(60) Provisional application No. 62/479,954, filed on Mar. 31, 2017.

(51) Int. Cl.
*H04L 29/06* (2006.01)
*G06F 13/40* (2006.01)
*G06F 13/42* (2006.01)

(52) U.S. Cl.
CPC ...... *H04L 63/1458* (2013.01); *G06F 13/4022* (2013.01); *G06F 13/4282* (2013.01); *H04L 63/1425* (2013.01); *G06F 2213/0026* (2013.01)

(58) Field of Classification Search
CPC ............ H04L 63/1458; H04L 63/1425; G06F 13/4022; G06F 13/4282; G06F 2213/0026
USPC ........................................................ 726/31
See application file for complete search history.

(56) References Cited

U.S. PATENT DOCUMENTS

| 9,027,127 B1* | 5/2015 | Soldo | H04L 63/1425 705/14.2 |
| 2002/0083175 A1* | 6/2002 | Afek | H04L 63/1416 709/225 |
| 2003/0145232 A1* | 7/2003 | Poletto | H04L 63/1408 726/22 |
| 2009/0216910 A1* | 8/2009 | Duchesneau | G06F 9/5072 709/250 |
| 2010/0124191 A1* | 5/2010 | Vos | H04L 29/12367 370/328 |

(Continued)

Primary Examiner — Andrew J Steinle
Assistant Examiner — Sakinah White Taylor
(74) Attorney, Agent, or Firm — Innovation Counsel LLP

(57) ABSTRACT

A computer storage array detects and counters denial of service (DoS) attacks and provides one or more remote initiators with access to one or more storage devices connected to the computer storage array. computer storage array includes: a computer processor configured to run an operating system for managing networking protocols; a networking device configured to monitor and route network traffic, at a packet level to, and from the storage devices; a baseboard management controller (BMC) configured to detect a DoS attack based on monitoring of statistics of the network traffic by the networking device; a PCIe switch connecting the BMC with each of the storage devices via a PCIe bus; and a computer motherboard to which the computer processor, networking device, BMC and PCIe switch are installed.

20 Claims, 3 Drawing Sheets

(56) References Cited

U.S. PATENT DOCUMENTS

| | | | |
|---|---|---|---|
| 2011/0161786 A1* | 6/2011 | Nishiyama | H04M 7/0084 714/776 |
| 2011/0320690 A1* | 12/2011 | Petersen | G06F 3/0611 711/103 |
| 2012/0082048 A1* | 4/2012 | Taft | H04L 12/1836 370/252 |
| 2012/0233694 A1* | 9/2012 | Baliga | G06F 21/568 726/23 |
| 2013/0340050 A1* | 12/2013 | Harrison | H04L 63/10 726/4 |
| 2013/0343408 A1* | 12/2013 | Cook | H04L 29/06136 370/474 |
| 2016/0179735 A1* | 6/2016 | Zou | G06F 13/4081 710/302 |
| 2016/0248620 A1* | 8/2016 | Itkin | H04L 41/04 |
| 2016/0308886 A1* | 10/2016 | Lee | H04L 63/1441 |
| 2017/0085637 A1* | 3/2017 | Cencini | H04L 67/1042 |
| 2017/0201537 A1* | 7/2017 | Caldwell | H04J 3/0667 |
| 2018/0101376 A1* | 4/2018 | Olarig | G06F 8/65 |

* cited by examiner ional Patent Application No. 62/479,954, titled
SYSTEM AND METHOD OF DETECTING AND COUNTERING DENIAL-OF-SERVICE (DOS) ATTACKS ON AN NVME-OF-BASED COMPUTER STORAGE ARRAY

CROSS-REFERENCE TO RELATED APPLICATIONS

This application claims priority to and the benefit of U.S. Provisional Patent Application No. 62/479,954, titled "Method of Improving Security of NVMe-oF-based Systems from Denial-of-Service (DoS) Attacks" and filed on Mar. 31, 2017, the entire content of which is incorporated herein by reference.

RELATED FIELD

The present disclosure relates to computer storage arrays. In particular, the present disclosure relates to a system and method of detecting and countering denial-of-service (DoS) attacks on a computer storage array.

BACKGROUND

A computer storage array, also called a disk array, is generally a data storage system to which a number of data storage devices, such as hard disk drives (HDDs) and solid-state disk drives (SSDs), are connected. Computer storage arrays are designed to be highly scalable and offer shared data access to multiple initiators, who may be end-point clients, computer servers, and/or other data consumers.

Storage devices that support the Non-Volatile Memory Express over Fabrics (NVMe-oF) specification (hereinafter, "NVMe-oF devices" for convenience) are becoming more popular, especially for use in computer storage arrays, due to their high performance and scalability. NVMe-oF is a technology specification designed to enable NVMe message-based commands to transfer data between an initiator, such as a host computer, and an NVMe-oF device or system over a network such as Ethernet, Fibre Channel, and InfiniBand. Thus, an NVMe-oF device generally includes functions of both a networking device (e.g., has Ethernet controller(s)) and a storage device (e.g., has SSD(s)).

As a networking device, an NVMe-oF device is susceptible to cyber-attacks, such as a denial-of-service (DoS) attack. A DoS attack is a cyber-attack in which the perpetrator seeks to make a machine or network resource unavailable to its intended users by temporarily or indefinitely disrupting services of a host connected to the Internet. A DoS attack is typically accomplished by flooding the targeted machine or resource with superfluous requests in an attempt to overload systems and prevent some or all legitimate requests from being fulfilled. When the flooding comes from multiple sources, the DoS attack is considered a distributed DoS (DDoS) attack.

A DoS attack is analogous to a group of people crowding the entry door or gate to a shop or business, and not letting legitimate parties enter into the shop or business, disrupting normal operations. Thus, the objective of a typical DoS attack by itself is not to steal or expose confidential data stored on a computer server or storage array, but to simply overwhelm it with bogus traffic. However, a DoS attack has been known to be used as a distraction away from other more nefarious cyber-attacks.

In some cases, an NVMe-oF device whose firmware or software has been infected or compromised may become an unwitting participant in a DoS attack against other systems.

Regardless of the scenario, detecting and countering DoS attacks often require companies to expend valuable resources. Moreover, the longer a DoS attack is prolonged, the more costly it may be to the company affected by the DoS attack.

SUMMARY

Disclosed herein is computer storage array that detects and counters denial of service (DoS) attacks, the computer storage array providing one or more remote initiators with access to one or more storage devices connected to the computer storage array. According to an example embodiment, the computer storage array comprises: a computer processor configured to run an operating system for managing networking protocols; a networking device configured to monitor and route network traffic, at a packet level to, and from the storage devices; a baseboard management controller (BMC) configured to detect a DoS attack based on monitoring of statistics of the network traffic by the networking device; a PCIe switch connecting the BMC with each of the storage devices via a PCIe bus; and a computer motherboard to which the computer processor, networking device, BMC and PCIe switch are installed.

Further disclosed herein is a computer-implemented method of detecting and countering incoming denial of service (DoS) attacks on a computer storage array, the computer storage array comprising a computer processor, a networking device, a baseboard management controller (BMC), and a PCIe switch connecting the BMC with a plurality of storage devices via a PCIe bus. According to an example embodiment, the method comprises: receiving, by the networking device, network traffic from one or more sources external to the computer storage array; monitoring and routing, by the networking device, the network traffic at a packet level to and from the storage devices; detecting, by the BMC, a DoS attack based on monitoring of statistics of the network traffic by the networking device; and changing, by the BMC, a current public IP address of one or more of the storage devices that are under attack to a different public IP address in response to detecting the DoS attack.

Further disclosed herein is a computer-implemented method of detecting and countering outgoing denial of service (DoS) attacks from a computer storage array, the computer storage array comprising a computer processor, a networking device, a baseboard management controller (BMC), and a PCIe switch connecting the BMC with a plurality of storage devices via a PCIe bus. According to an example embodiment, the method comprises: receiving, by the networking device, network traffic from one or more of the storage devices; monitoring and routing, by the networking device, network traffic at a packet level; detecting, by the BMC, an outgoing DoS attack based on monitoring of statistics of the network traffic by the networking device; and disabling or quarantining, by the BMC, the storage device in response to detecting the DoS attack.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

Figure 1:
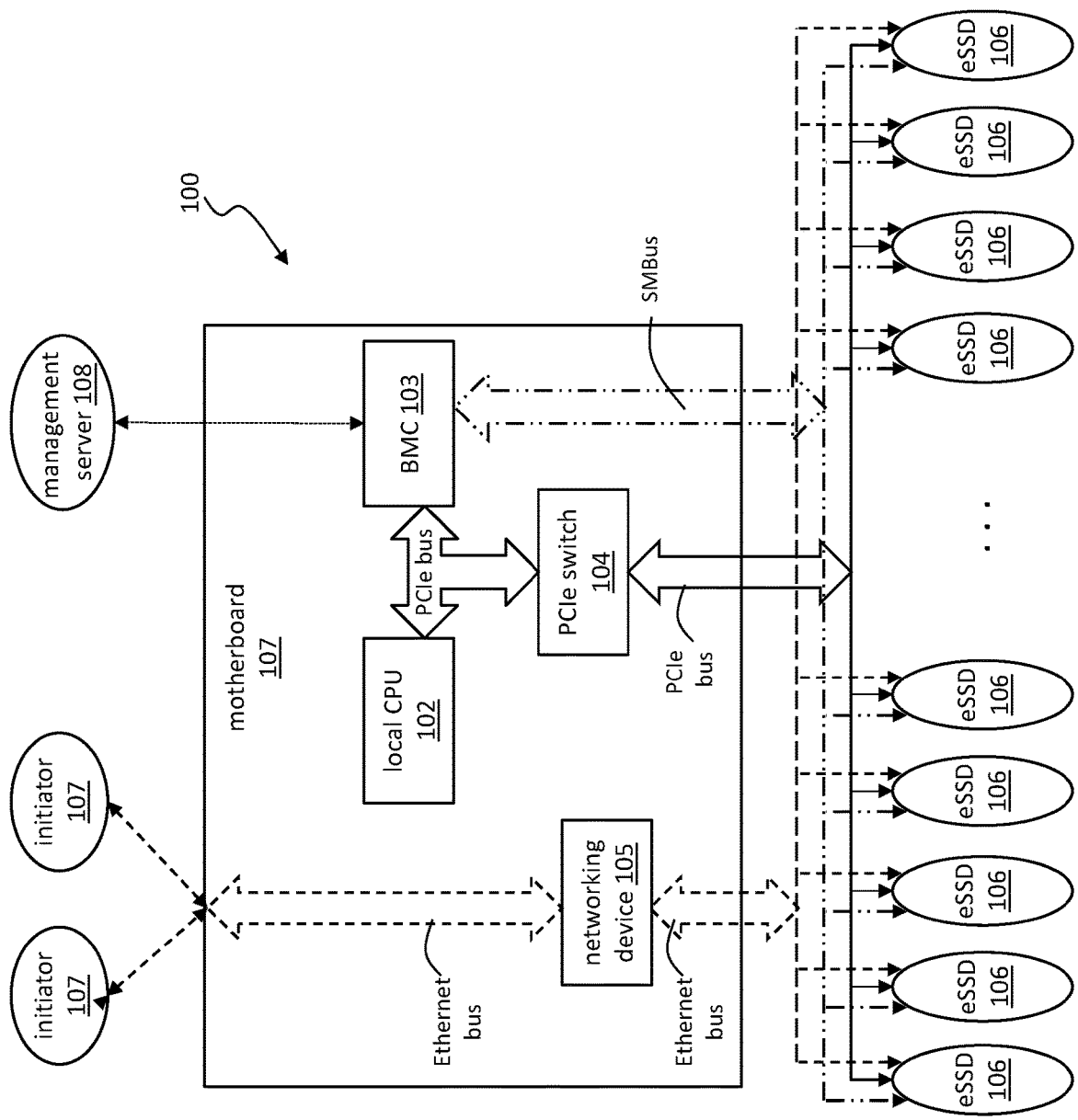
FIG. 1 illustrates an example computer storage array that utilizes a BMC to detect and counter incoming DoS attacks on or outgoing DoS attacks from the NVMe-oF devices, according to embodiments of the present system and method.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide the present system and method. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

According to embodiments of the present system and method, a baseboard management controller (BMC) may be used to detect and counter incoming DoS attacks directed towards NVMe-oF devices of a computer storage array, as well as outgoing DoS attacks being participated by one or more compromised NVMe-oF devices. The BMC is a low-power controller embedded in computer storage arrays, servers, switches, etc., and connects to chassis sensors (e.g., temperature sensor, power supply voltage sensor, and humidity sensor) to read environmental conditions and to control various devices. The BMC also has access to and control of NVMe-oF devices through local system buses, such as the Peripheral Component Interconnect Express (PCIe) bus and the System Management Bus (SMBus). Thus, the BMC is in a unique position to disable and/or recover any infected or hijacked NVMe-oF devices.

As traditionally implemented, the BMC operates as a slave device to a CPU, which has unidirectional control over the BMC. In other words, the traditionally implemented BMC receives instructions from the CPU and does not operate independently of the CPU. In contrast, according to example embodiments of the present system and method, the BMC may be implemented such that the BMC operates independently of and without intervention from the CPU of the computer storage array. In other words, the BMC may operate as a master device that has increased complexity. By using the BMC to detect and counter DoS attacks, rather than using a third-party server, it allows for quicker detection of incoming and outgoing DoS attacks and recovery of the computer storage array.

According to embodiments of the present system and method, the BMC may detect a DoS or DDoS attack from external sources and negate the attack by changing the public IP addresses of uplink ports of the computer storage array. The BMC may also notify a system administrator, as well as host initiators affected by the change, of the public IP address changes.

According to embodiments of the present system and method, the BMC may also detect that an NVMe-oF device and/or a motherboard or chassis has been hijacked by malicious codes, by detecting destination IP addresses that are not "known" or "registered" with the local network switch. After detection, the BMC may shut down or otherwise disable the hijacked NVMe-oF device and/or motherboard and then notify the system administrator to scan the system. In some cases, since a scan may only detect a virus infection if the virus signature is known, the BMC may erase the existing firmware or software installed on the NVMe-oF device and/or motherboard, download and install a new firmware or software onto the NVMe-oF device and/or motherboard, and reboot the affected computer storage devices.

FIG. 1 illustrates an example computer storage array that utilizes a BMC to detect and counter incoming DoS attacks on or outgoing DoS attacks from the NVMe-oF devices, according to embodiments of the present system and method. The computer storage array 100 includes a computer motherboard 101, a local CPU 102, a BMC 103, a PCIe switch 104, a networking device 105, and a plurality of NVMe-oF devices 106. In this case, the NVMe-oF devices 106 may be Ethernet-enabled SSDs (eSSDs) including an Ethernet port, a PCIe port, and an SMBus port, and the networking element 105 may be a network address translation (NAT) router, network switch (e.g., layer 3 switch), etc. The computer storage array 100 provides one or more remote initiators 107 with access to one or more of the NVMe-oF devices 106 connected to the storage array 100.

According to example embodiments, the local CPU 102, BMC 103, PCIe switch 104, and networking device 105 may be integrated or built into the motherboard 101 or may be installed onto the motherboard 101 as discrete components. These components may be implemented using hardware components, software components, or a combination of hardware and software components. Although FIG. 1 shows these components as separate components, one or more of these components may be combined. The computer motherboard 101 includes at least an Ethernet bus, a PCIe bus, and a SMBus. The local CPU 102 is configured to run an operating system for managing networking protocols. The networking device 105 is configured to monitor and route network traffic, at a packet level, to and from the NVMe-oF devices 106. The networking device 105 has access to a list of known source/destination addresses, such as a network address translation table. Any new initiator that connects to the NVMe-oF devices may be added as an entry in the list or table.

The BMC 103 communicates with a management server 108 via an out-of-band connection separate from an in-band connection established via the Ethernet bus. The BMC 103 may communicate with the management server 108 using an Intelligent Platform Management Interface (IPMI). The IPMI is a set of computer interface specifications for a computer subsystem, such as the BMC 103, that provides management and monitoring capabilities independently of the system's local CPU, firmware, and operating system.

The BMC 103 and CPU 102 are locally connected to the NVMe-oF devices 106 via local buses. For example, the PCIe switch 104 connects the BMC 103 and CPU 102 with each of the NVMe-oF devices 106 via a separate PCIe bus. The BMC 103 and CPU 102 are each capable of configuring the network settings of NVMe-oF devices 106. The BMC 103 is further configured to detect a DoS attack based on the monitoring (e.g., monitoring the statistics) of the network traffic, to and from the NVMe-oF devices 106, by the networking device 105.

Figure 2:
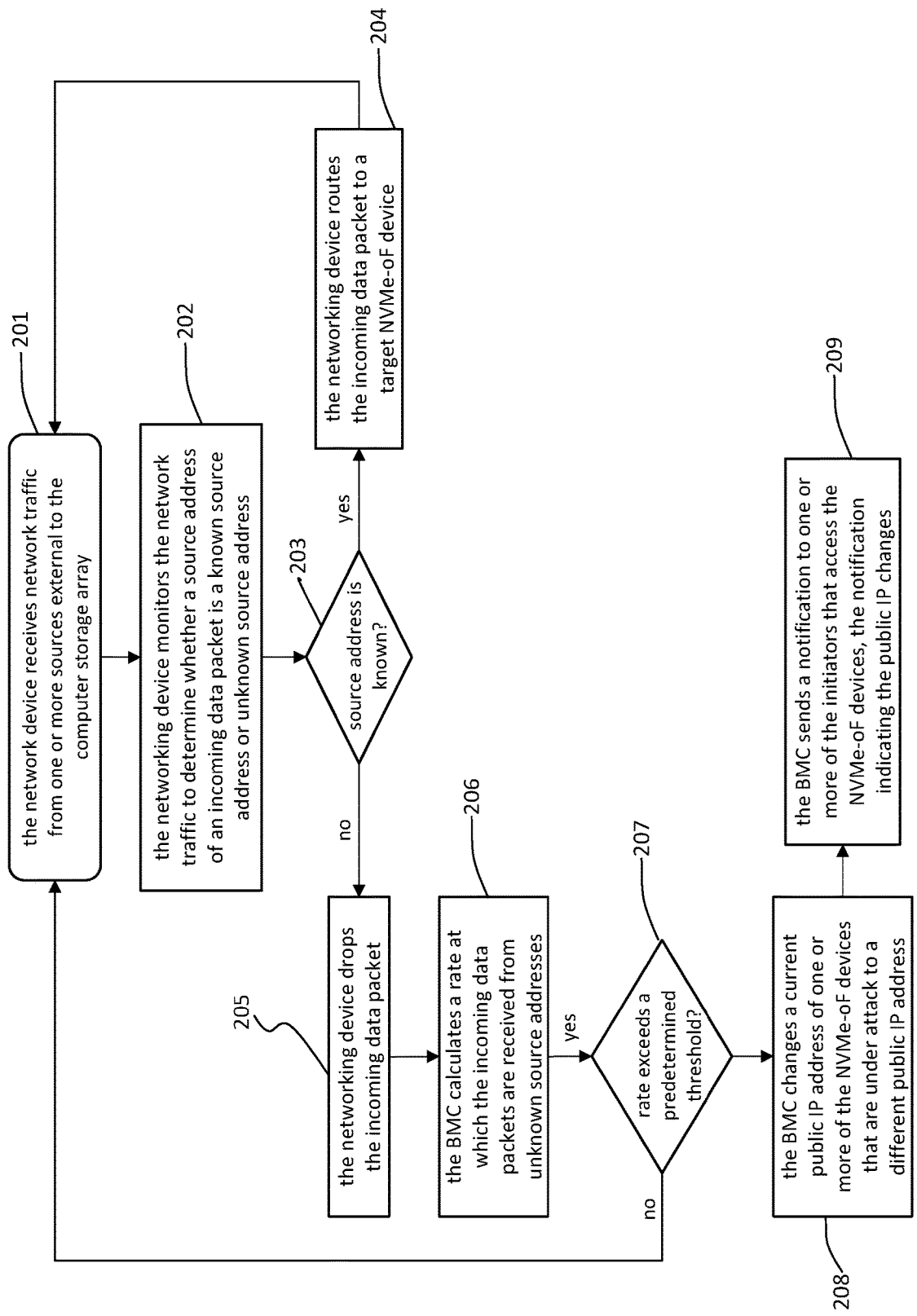
FIG. 2 illustrates an example computer-implemented method of using the BMC to detect and counter an incoming DoS attack from an external source, according to embodiments of the present system and method.

FIG. 2 illustrates an example computer-implemented method of using the BMC to detect and counter an incoming DoS attack from an external source, according to embodiments of the present system and method. Although the BMC 103 and the networking device 105 are described as performing the operations below, the present system and method are not limited thereto. For example, some of the operations may be performed by other components, such as the CPU.

The network device 105 receives network traffic from one or more sources external to the computer storage array (at 201). The network device 105 monitors and routes the network traffic at a packet level. In particular, the network device 105 monitors the network traffic to determine whether a source address of an incoming data packet is a known source address (e.g., on a list of known source addresses) or an unknown source address (e.g., not on the list of known source addresses) (at 202).

If the source address of the incoming data packet is a known source address (at 203), the network device 105 routes the incoming data packet to the target NVMe-oF device 106 (at 204). If the source address of the incoming data packet is an unknown source address (at 203), the network device 105 drops the incoming data packet (at 205).

The BMC 103 detects a DoS attack based on the monitoring of the network traffic by the networking device 105. For example, if the BMC 103 determines that many incoming data packets are being dropped within a short time frame, the BMC 103 may determine that the NVMe-oF devices 106 are under DoS attack. In other words, the BMC calculates a rate at which the source addresses of incoming data packets corresponds to unknown source addresses (in this case, the rate at which incoming data packets are dropped) (at 206).

If the BMC determines that the rate exceeds a predetermined threshold (at 207), the BMC changes the current public IP address of one or more of the NVMe-oF devices that are under attack to a different public IP address (at 208). The BMC 103 may determine which of the NVMe-oF devices are under attack based on the destination address of the incoming data packets being dropped. The public IP address, for example, may correspond to a NAT public IP address used by initiators 107 to address an NVMe-oF device 106. The different public IP address may be chosen from a range of reserved IP addresses or may be determined based on a pattern or algorithm. The BMC 103 sends a notification to one or more of the initiators 107 that access the NVMe-oF devices 106 via the LAN management port, the notification indicating the public IP changes (at 209). For example, the notification may include the different public IP address or may inform the initiators to use the next IP address in the range of reserved IP addresses to access the NVMe-oF device 106 whose public IP address changed by providing a new index pointer.

Accordingly, the computer-implemented method of FIG. 2 allows the BMC 103 to quickly detect a DoS attack, counter the attack by changing the current public IP address of an NVMe-oF device 106 under attack to a different IP address, and notify the initiators who would be affected by the IP address change to use the different IP address for subsequent access to the NVMe-oF device 106. According to another embodiment, the BMC 103 may counter the DoS attack by disabling the current public address of the NVMe-oF device 106 under attack.

Figure 3:
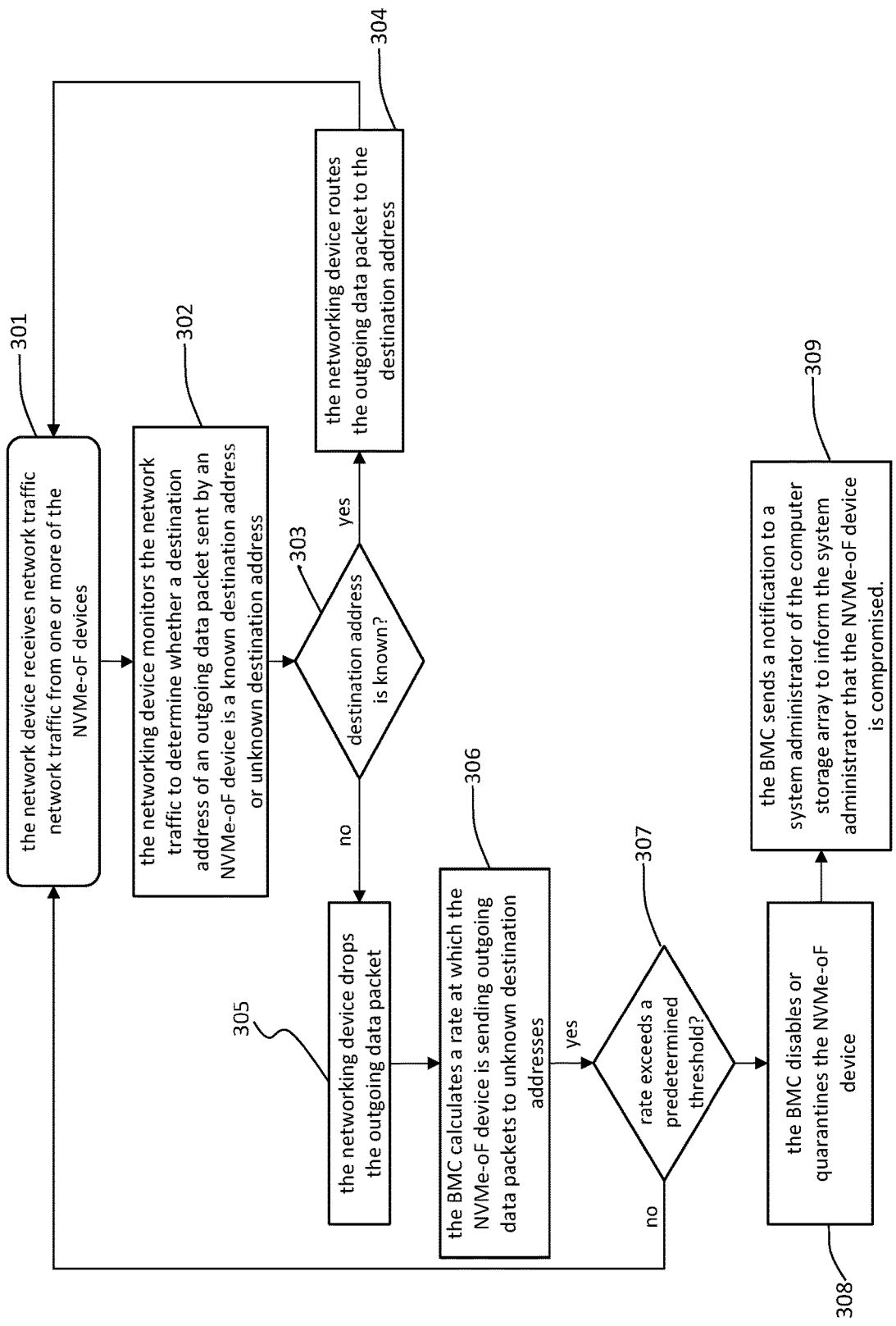
FIG. 3 illustrates an example computer-implemented method of using the BMC to detect and prevent a hijacked NVMe-oF device from participating in an outgoing DoS attack, according to embodiments of the present system and method.

FIG. 3 illustrates an example computer-implemented method of using the BMC to detect and prevent a hijacked NVMe-oF device from participating in an outgoing DoS attack, according to embodiments of the present system and method. Although the BMC 103 and the networking device 105 are described as performing the operations below, the present system and method are not limited thereto. For example, some of the operations may be performed by other components, such as the CPU.

The network device 105 receives network traffic from one or more of the NVMe-oF devices (at 301). The network device 105 monitors and routes the network traffic at a packet level. In particular, the network device 105 monitors the network traffic to determine whether a destination address of an outgoing data packet sent by an NVMe-oF device is a known destination address (e.g., on a list of known destination addresses) or an unknown destination address (e.g., not on the list of known destination addresses) (at 302).

If the destination address of the outgoing data packet is a known destination address (at 303), the network device 105 routes the outgoing data packet to the destination address (at 304). If the destination address of the outgoing data packet is an unknown destination address (at 303), the network device 105 drops the outgoing data packet (at 305).

The BMC 103 detects an outgoing DoS attack based on the monitoring of the network traffic by the networking device 105. For example, if the BMC 103 determines that many outgoing data packets sent by the NVMe-oF device are being dropped within a short time frame, the BMC 103 may determine that the NVMe-oF device has been hijacked and is participating in an outgoing DoS attack. In other words, the BMC calculates a rate at which the destination addresses of the outgoing data packets sent by the NVMe-oF device correspond to unknown source addresses (in this case, the rate at which incoming data packets are dropped) (at 306).

If the BMC determines that the rate exceeds a predetermined threshold (at 307), which may indicate that the NVMe-oF has been hijacked and is participating in an outgoing DoS attack, the BMC 103 changes disables or quarantines the NVMe-oF device 106 (at 308), for example, by keeping a reset signal active until further appropriate recommended action has been determined by the system admin. The BMC 103 sends a notification to a system administrator of the computer storage array to inform the system administrator that the NVMe-oF device is compromised. According to other embodiments, if the BMC determines that the NVMe-oF has been hijacked or otherwise compromised, the BMC 103 may erase an existing firmware or software installed on the NVMe-oF device, and download and install a new firmware or software onto the NVMe-oF device.

Accordingly, the computer-implemented method of FIG. 3 allows the BMC 103 to quickly detect whether one or more NVMe-oF devices has been hijacked and become a participant in an outgoing DoS attack, counter the attack by disabling or quarantining the hijacked NVMe-oF devices, and notify the system administrator that the NVMe-oF devices are compromised.

Various embodiments of the present system and method may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A computer storage array that detects and counters denial of service (DoS) attacks, the computer storage array providing one or more initiators with access to one or more storage devices connected to the computer storage array, the computer storage array comprising:
    a computer processor configured to run an operating system for managing networking protocols;
    a networking device configured to monitor and route network traffic, at a packet level, to and from the one or more storage devices based on a public Internet Protocol (IP) address assigned to each of the one or more storage devices;
    a baseboard management controller (BMC) configured to detect a DoS attack based on monitoring of statistics of the network traffic by the networking device;
    a peripheral component interconnect express (PCIe) switch connecting the BMC with each of the one or more storage devices via a PCIe bus; and
    a computer motherboard to which the computer processor, networking device, BMC and PCIe switch are installed,
    wherein the BMC is further configured to calculate a rate at which a source address of incoming data packets corresponds to an unknown source address, determine that a storage device among the one or more storage devices associated with the incoming data packets is under attack based on the rate exceeding a predetermined threshold, and change a current public IP address of the storage device to a different public IP address.

2. The computer storage array of claim 1, wherein the networking device is a network address translation (NAT) router or a network switch.

3. The computer storage array of claim 2,
    wherein the networking device has access to a list of known source addresses, and
    wherein to monitor the network traffic includes determining whether the source address of the incoming data packet matches one of the known source addresses or is the unknown source address not on the list of known source addresses.

4. The computer storage array of claim 2,
    wherein the networking device has access to a list of known destination addresses, and
    wherein to monitor the network traffic includes determining whether a destination address of an outgoing data packet sent by the storage device matches one of the known destination addresses or is an unknown destination address not on the list of known destination addresses.

5. The computer storage array of claim 4, wherein to detect the DoS attack includes:
    calculating a rate at which the destination address of outgoing data packets sent by the storage device corresponds to the unknown destination address, and
    determining whether the rate exceeds a predetermined threshold.

6. The computer storage array of claim 5, wherein the BMC is configured to disable or quarantine the storage device based on the rate exceeding the predetermined threshold.

7. The computer storage array of claim 5, wherein the BMC is configured to:
    erase an existing firmware or software installed on the storage device, and
    install a new firmware or software onto the storage device.

8. The computer storage array of claim 5, wherein the BMC is configured to notify a system administrator of the computer storage array that the storage device is compromised.

9. The computer storage array of claim 1, wherein the BMC is further configured to send a notification to the one or more initiators that access the storage device, the notification indicating public IP changes.

10. The computer storage array of claim 9, wherein the networking device is configured to:
    route the incoming data packet to a target storage device based on the source address of the incoming data packet matching one of the known source addresses, and drop the incoming data packet based on the source address of incoming data packet corresponding to the unknown source address.

11. A computer-implemented method of detecting and countering incoming denial of service (DoS) attacks on a computer storage array, the computer storage array comprising a computer processor, a networking device, a baseboard management controller (BMC), and a peripheral component interconnect express (PCIe) switch connecting the BMC with one or more storage devices via a PCIe bus, the method comprising:
  receiving, by the networking device, network traffic from one or more sources external to the computer storage array;
  monitoring and routing, by the networking device, the network traffic at a packet level to and from the one or more storage devices based on a public Internet Protocol (IP) address assigned to each of the one or more storage devices;
  detecting, by the BMC, a DoS attack based on monitoring of statistics of the network traffic by the networking device;
  changing, by the BMC, a current public IP address of a storage device among the one or more storage devices that is under attack to a different public IP address in response to detecting the DoS attack; and
  sending a notification to one or more initiators that access the storage device, the notification indicating a change of the current public IP address to the different public IP address.

12. The computer-implemented method of claim 11, wherein the networking device is a network address translation (NAT) router or a network switch.

13. The computer-implemented method of claim 11,
  wherein the networking device has access to a list of known source addresses, and
  wherein monitoring the network traffic includes determining whether a source address of an incoming data packet matches one of the known source addresses or is an unknown source address not on the list of known source addresses.

14. The computer-implemented method of claim 13, wherein detecting the DoS attack includes:
  calculating a rate at which the source address of incoming data packets corresponds to the unknown source address, and
  determining whether the rate exceeds a predetermined threshold.

15. The computer-implemented method of claim 13, wherein routing the network traffic by the networking device includes:
  routing the incoming data packet to a target storage device based on the source address of the incoming data packet matching one of the known source addresses, and
  drop the incoming data packet based on the source address of the incoming data packet corresponding to the unknown source address.

16. A computer-implemented method of detecting and countering outgoing denial of service (DoS) attacks from a computer storage array, the computer storage array comprising a computer processor, a networking device, a baseboard management controller (BMC), and a peripheral component interconnect express (PCIe) switch connecting the BMC with one or more storage devices via a PCIe bus, the method comprising:
  receiving, by the networking device, network traffic from one or more storage devices;
  monitoring and routing, by the networking device, network traffic at a packet level based on a public Internet Protocol (IP) address assigned to each of the one or more storage devices;
  detecting, by the BMC, an outgoing DoS attack based on monitoring of statistics of the network traffic by the networking device; and
  disabling or quarantining, by the BMC, a storage device among the one or more storage devices in response to detecting the DoS attack;
  routing an outgoing data packet to a destination address based on the destination address of the outgoing data packet matching a known destination address of a list of known destination addresses, and
  drop the outgoing data packet based on the destination address of the outgoing data packet corresponding to an unknown destination address.

17. The computer-implemented method of claim 16,
  wherein the networking device has access to the list of known destination addresses, and
  wherein monitoring the network traffic includes determining whether the destination address of the outgoing data packet sent by the storage device matches one of the known destination addresses or is the unknown destination address not on the list of known destination addresses.

18. The computer-implemented method of claim 17, wherein detecting the DoS attack includes:
  calculating a rate at which the destination address of outgoing data packets sent by the storage device corresponds to the unknown destination address, and
  determining whether the rate exceeds a predetermined threshold.

19. The computer-implemented method of claim 18, further comprising sending, by the BMC, a notification to a system administrator of the computer storage array, the notification indicating that the storage device is compromised.

20. The computer-implemented method of claim 18, further comprising the following based on the rate exceeding the predetermined threshold:
  erasing, by the BMC, an existing firmware or software installed on the storage device, and
  installing, by the BMC, a new firmware or software onto the storage device.

* * * * *